Sept. 27, 1955   R. H. DEITRICKSON   2,718,880
ACTUATOR FOR DOWNWELL PUMPS
Filed March 4, 1953   2 Sheets-Sheet 1
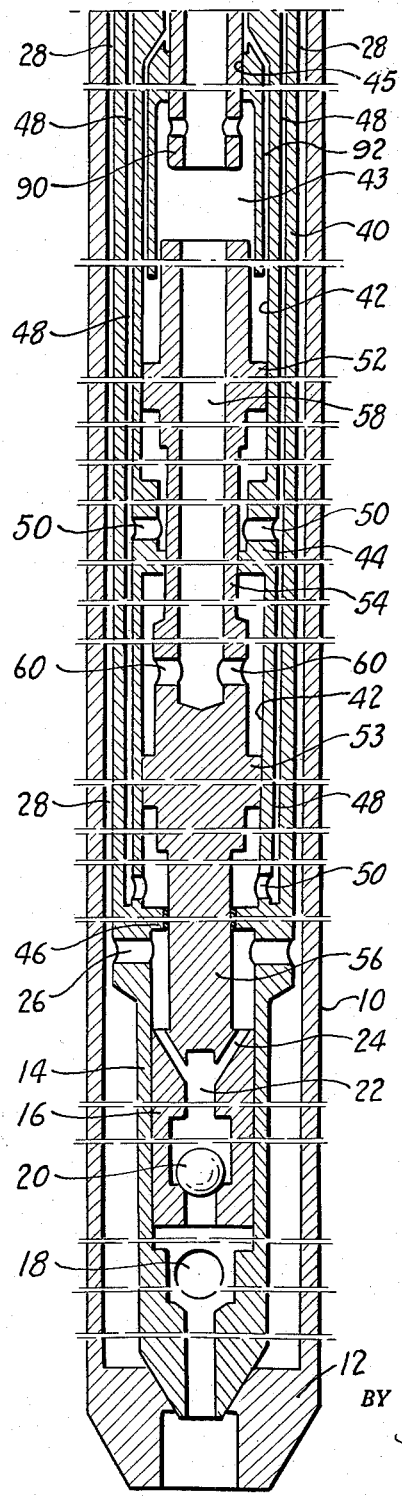
INVENTOR.
Roy H. Deitrickson
BY
ATTORNEYS

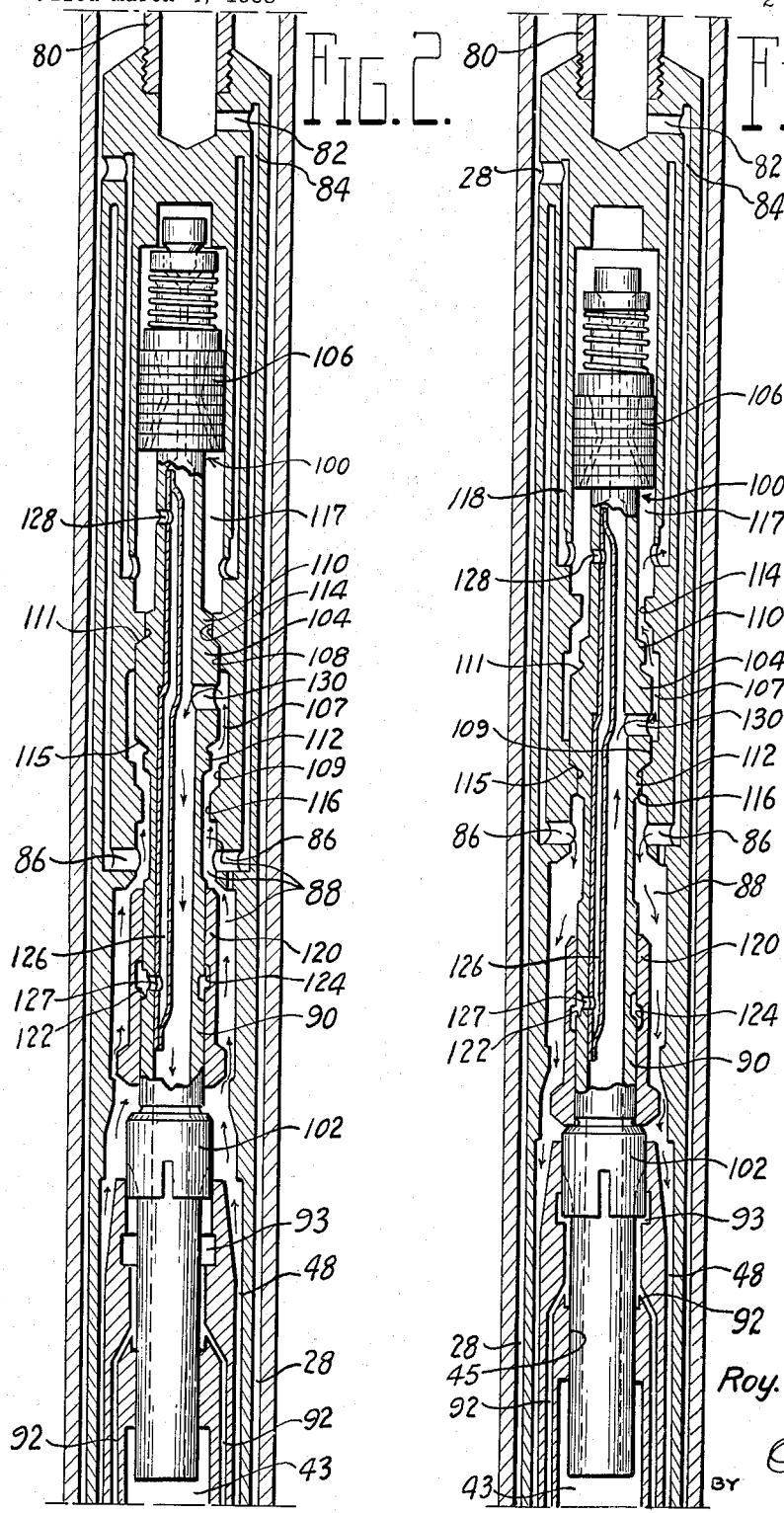

United States Patent Office 2,718,880
Patented Sept. 27, 1955

2,718,880
ACTUATOR FOR DOWNWELL PUMPS

Roy H. Deitrickson, Toledo, Ohio, assignor to The National Supply Company, Pittsburgh, Pa., a corporation of Pennsylvania Application March 4, 1953, Serial No. 340,335

3 Claims. (Cl. 121—122)

This invention relates to an improved hydraulic engine for operating a downwell pump, and has for its primary object the provision of means to increase the power available to operate the pump for a given operating pressure, thus making possible the use of a pump of given size at a reduced operating pressure, or a larger size pump at a given operating pressure.

In the operation of hydraulically actuated downwell pumps it is sometimes highly desirable to be able to reduce the pressure required to be developed in the operating fluid. If the operating pressure at a given level can be reduced, the expense of operation of a given pump and of the installation in general can be reduced, because less elaborate surface equipment is required to produce and maintain the necessary pressure in the power fluid, there will be less wear on the valving through which the fluid must pass, and there will be less danger of breakdowns due to failure of any part of the system under pressure. On the other hand for a given operating pressure, an actuator capable of delivering increased power will permit operation of a larger pump or a given pump at deeper levels.

It is an object of the invention to provide a hydraulic actuator for a downwell pump that is capable of delivering greatly increased power to the pump for a given size of engine cylinder and for a given operating pressure.

It is another object of the invention to provide a hydraulic actuator of this character that is simple and reliable in operation and that is relatively simple to construct and maintain.

Briefly stated, the invention comprises the provision of a hydraulic actuator of the differential area type having a plurality of tandem pistons which are constantly exposed to the pressure of the power fluid on one side while the opposite sides are alternately subjected to the pressure of the power fluid and a pressure less than that of the power fluid. Any suitable valving may be used to control the flow of the power fluid, and any suitable pump may be connected to be driven by the actuator.

The hydraulic actuator or engine of the present invention is particularly adapted for operation with the valving described and claimed in my co-pending application Serial No. 297,473, now Patent No. 2,682,257, although any equivalent valving may be used to control the flow of power fluid to the spaces above and below the several pistons.

Other objects and advantages of the invention will become apparent from the following specification, reference being had to the accompanying drawings, in which:

Fig. 1 is a central vertical sectional view, with parts broken out, of a pump embodying the present invention;

Fig. 2 is a somewhat diagrammatic central vertical sectional view with parts broken away of a valve mechanism suitable for use with the present invention, the parts being shown in the position occupied during the downstroke of the pump; and Fig. 3 is a view of the valve mechanism similar to Fig. 2, but with the parts in the position occupied during an upstroke of the pump.

In the form of the invention shown in the drawings, 10 designates a tubing of a well in which the pump is installed, the tubing having a pump seat 12 installed at the producing level in the usual manner.

The pump itself may comprise a pump cylinder 14, a pump piston 16 and the usual standing valve 18 and traveling valve 20 which go to make up a single acting pump. The piston 16 has a central passage 22 controlled by the traveling valve 20 and terminating in passages 24 discharging into the pump cylinder above the piston. Discharge passages 26 communicate between the pump cylinder and a production fluid discharge annulus 28 around the pump within the well tubing so that fluid pumped by the pump may be conducted to the surface within this annulus. It will be understood that the entire pumping device may be set in the well as a "free pump" by suitable packers so that it is capable of removal by the circulation of pressure fluid beneath it, or it may be set to receive its power oil from a string of small diameter pipe extending to the surface.

The engine of the present invention comprises a casing 40 spaced from the well tubing by the discharge annulus 28. Within the casing 40 are a plurality of tandem engine cylinders 42, of which two are shown in the present form of the invention. The upper engine cylinder communicates at the top with the valving which will be presently described and at its lower end is spaced from the lower engine cylinder by a packed coupling 44.

The lower engine cylinder is attached to the top of the pump cylinder by a packed coupling 46.

The lower end of each of the engine cylinders 42 is constantly supplied with power fluid through the annulus 48 formed between the exterior of the tandem cylinders and the interior of the pumping unit casing 40, there being openings 50 between the annulus 48 and the interior of each of the cylinders to permit power fluid to flow freely into the cylinders from the annulus and vice versa, the power fluid constantly exerting its force on the lower side of each of the engine pisons.

Engine pistons 52, 53 are provided for each of the engine cylinders and are connected together for tandem reciprocation by a hollow piston rod 54 which extends through the packed coupling 44. The engine pistons are connected to the pump piston by a solid rod 56 which extends through the packed coupling 46.

The passage through the interior of the hollow rod 54 is designated 58 in the drawings and this passage is brought into communication with the upper end of the lower cylinder 42 by passages 60 so that the upper end of each cylinder is subjected to the same pressure and the cylinders can be vented or filled simultaneously. The cross-sectional area of the passage 58, on a plane perpendicular to the axis thereof, is a very important dimension of the present invention as it assists in determining the proportionate loading of the upper and lower engine pistons. Both pistons are of the differential area type with the greater area on the top side so that equal fluid pressures on the two sides cause a downward movement.

It will be apparent that, since the piston connecting rod 54 is hollow, the effective area of the top of the upper piston is equal to the cross-sectional area of the cylinder minus the area of the hole through the rod, or the passage 58. Similarly, inspection will show that the effective area of the lower side of the upper piston is equal to the cross-sectional area of the cylinder minus the entire cross-sectional area of the rod.

Considering the lower engine cylinder, it will be seen that the effective area of the upper end, above the piston, is equal to the cross-sectional area of the cylinder minus the cross-sectional area of the wall of the rod 54. Stated differently, the effective area of this piston surface is equal to the cross-sectional area of the cylinder minus the area of the rod 54 plus the area of the passage 58 through the rod, since fluid exerting a downward force in the passage 58 exerts that force only on the lower engine piston.

The effective area of the lower side of the lower piston is equal to the cross-sectional area of the engine cylinder minus the cross-sectional area of the solid rod 56. In practice the rod 56 is made slightly larger than the hollow connecting rod 54 so that the lower rod can be made to carry more of the load on the downstroke. By reducing the proportion of the load carried by the upper piston and communicated to the pump piston by the hollow rod 54, any tendency for the long hollow member to bend in its travel is reduced and wear on the packed coupling 44 is also reduced.

Any suitable valving may be used to control the flow of working fluid to and from the upper side of each of the working pistons. However, I prefer to use valving such as is disclosed and claimed in my copending application Serial No. 297,473. The valving is shown in two positions of its movement in Figures 2 and 3.

As above noted, working fluid is constantly supplied under full working pressure to the underside of each of the engine pistons through annulus 48 and ports 50. When the working fluid is introduced at the same pressure into the spaces in the tandem cylinders 42 above the pistons, the latter move down since the area on which the working fluid acts is greater on the top side of the pistons than on the lower side, as set forth above. When the spaces above the tandem pistons are connected to a discharge line at lower pressure, the pressure of the working fluid against the lower sides of the tandem pistons predominates and the engine pistons move upwardly to cause an upstroke of the associated pump piston.

Valving to control working fluid is shown in Fig. 2 in the position occupied during a downstroke of the engine pistons so that fluid is being admitted to the top of each of the cylinders 42. In the form shown, the power fluid is conducted from the surface of the ground through a string of small tubing 80 and thence by a side passage 82 to an annular passage 84 which terminates in a plurality of inwardly directed openings 86 leading to the interior of the valve casing and a flow chamber 88. Flow chamber 88 is in direct and open communication with the annular passage 48 which supplies power fluid to the lower end of each of the engine cylinders 42 through their respective inlet ports 50.

A comparison of Figs. 1 and 2 or Figs. 1 and 3 will show that a portion of the upper end of the upper engine cylinder 42 is shown in both figures. The upper cylinder terminates in a reduced diameter pocket 43 and an axial bore 45 though which extends the lower end of a tubular valve stem 90. A series of longitudinally extending passageways 92 are drilled to connect the upper end of the upper cylinder 42 with the lower end of flow chamber 88, so that pressure on the upper engine cylinder may be communicated to the flow chamber at the end of an upstroke of the engine pistons as hereinafter described.

The valve stem 90 is operatively integral with a sliding valve body indicated generally at 100 and provided with a lower balancing valve portion 102, an intermediate spool valve portion 104 and an upper balancing piston 106. The entire body is balanced hydraulically, except for certain predetermined biasing forces, and is thus capable of movement between its flow controlling positions without contact by, or any mechanical connection with, the engine piston.

The spool valve 104 carried on or integral with the valve stem 90 is located within a valve chamber 107 and cooperates with axially spaced cylindrical surfaces 108 and 109. The sealing effect of the valve is thus in conjunction with the periphery which can be very closely fitted. Pilot extensions 110 and 112 are formed on the valve body and cooperate, in turn, with less closely fitted cylindrical walls 114 and 116 on the valve casing. The slanting surfaces joining the two cylindrical surfaces at each end of the valve, designated 111 and 115 cooperate with similar surfaces on the valve casing to limit the upward and downward movement of the valve and valve stem. The slanting surfaces 111 and 115 are cut at a slightly different angle than the cooperating stationary surfaces so that sealing takes place at a line around the largest diameter of the spool valve and the effective area of the spool valve is essentially its entire diameter insofar as the pressures acting above and below the valve are concerned.

At its upper side, the spool valve controls communication between the valve chamber 107 and a discharge chamber 117 which opens to an annular discharge passage 118 from which spent operating fluid may pass back to the surface through the discharge annulus 28.

The entire valve assembly is biased to a down position by a collar 120 carried over the valve stem 90. The biasing force is derived from fluid pressure against the outer collar surfaces, the upper area of the collar being larger than the lower area. For this reason the valve stem 90 is stepped at 122, the portion above the step being of smaller cross-sectional area than the portion below the step. Since the valve shifting collar 120 reciprocates over the stem in the course of its valve shifting movement, it is provided with an interior recess 124 of such axial length that the collar can make an appreciable axial excursion without interference by the shoulder formed by the stepped contour of the stem. The volume formed by the recess 124 is maintained at a relatively low pressure, corresponding to the discharge pressure, by a sealed conduit or passageway 126 disposed within the bore of the valve stem 90 and connected to the recess at its lower end and by a suitable side passage 127 to the discharge chamber 117 by a side passage 128 at its upper end.

The collar 120 thus moves downwardly and urges the valve stem and spool valve into a lower position as shown in Fig. 3 whenever the pressures on its upper and lower faces are balanced. Only so long as the product of the pressure on its lower face times its effective area exceeds the product of pressure and area of the upper face will the collar and valve stem remain in the upper position as shown in Fig. 2. During a downstroke of the engine pistons, working fluid is admitted from annular conduit 84 through chamber 88, pass spool valve 104 into valve chamber 107, through a passage 130 in the valve to the bore of the valve stem 90, and thence to the upper engine cylinder and to the lower engine cylinder through the interior of the piston rod 58 and side passage 60.

As the plurality of engine pistons move down, fluid is forced out of the lower side of each of the engine cylinders through the ports 50 and up the annular passage 48. This fluid acts against the lower surface of the valve collar 120 holding it up in position shown in Fig. 2. During the downward movement the pressure of the fluid being forced out of the lower end of the engine cylinders exceeds the pressure of the fluid in flow chamber 88 so that there is a pressure drop across the flange-like extension of the valve shifting collar 120 and the pressure on the upper surface of the valve collar is thus less than the pressure on the lower surface. These circumstances continue to exist so long as the pistons continue to move down. When such motion stops, however, by reason of the pistons reaching the lower end of their stroke, the pressures on the upper and lower surfaces of the valve shifting collar 120 become equalized and, since the upper surface predominates in area as above set forth, the valve shifting collar moves downwardly and abuts the upper surface of the balancing valve portion 102 forcing the entire assembly down to the position shown in Fig. 3.

When the spool valve 104 has moved away from its upper seat and into contact with its lower seat as shown in Fig. 3, the parts are in such a position that the upper end of each of the engine cylinders is connected to the discharge passage 118 through the discharge chamber 117 and the interior or bore of the stem 90. Thus the pressure on the upper side of each of the working pistons is lower than the pressure on the lower side and the pistons move upwardly. Fluid is supplied to the lower side of each of the engine pistons through ports 86, flow chamber 88 and the annual passage 48 into which each of the supply ports 50 opens.

As the uppermost engine piston approaches the top of the stroke an extension thereof enters the pocket 43 to trap a small volume of fluid above the principal surface of the upper piston 52. This fluid has as its only outlet the longitudinally extending passageways 92 which terminate in a chamber 93 beneath the balancing valve portion 102 on the valve stem. The pressure of the trapped fluid is thus made to exceed the pressure of the operating fluid and since the trapped fluid acts against the lower portion of the valve portion the entire valve stem is hydraulically shifted upwardly to the position shown in Fig. 2. It will be seen that such shifting takes place without the necessity of the engine piston mechanically contacting the lower portion of the valve stem so that a smooth reversal takes place without mechanical shock.

When the valve shifts to its upper position the communication between the upper end of each of the engine cylinders and the discharge passage is cut off by the spool valve 104 and communication is established between these cylinders and the supply passages so that the next downstroke begins.

It will thus be seen that the valving operates to admit pressure fluid to the several tandem cylinders, above the pistons therein, to cause a downstroke of the actuator and pump pistons, and after the completion of the downstroke, to connect the upper ends of the several cylinders to a discharge passage at lower pressure whereby an upstroke is caused by the working pressure acting on the lower side of each of the engine pistons.

While the invention has been described in conjunction with a specific form and disposition of the parts, it should be expressly understood that the disclosure is illustrative only, and that more than two engine cylinders, different valving and numerous other modifications and changes may be made without departing from the scope of the appended claims.

Having thus described my invention, I claim:

1. A hydraulic actuator comprising, in combination, a plurality of engine cylinders arranged in spaced tandem relationship, a plurality of connected differential area engine pistons disposed in the respective engine cylinders, a source of operating fluid under pressure, and means to admit operating fluid constantly to one side of each of said pistons and, cyclically to apply operating fluid and to vent the cylinder spaces on the opposite side of each of said pistons whereby the differential areas of said pistons cause movement thereof in one direction when the pressure of operating fluid is exerted on the opposite faces, and the differential between the pressure of operating fluid and vented fluid pressure causes movement of said pistons in the opposite direction.

2. A hydraulic actuator comprising, in combination, a plurality of engine cylinders arranged in spaced tandem relationship, a plurality of connected differential area engine pistons disposed in the respective engine cylinders, a source of operating fluid under pressure, and means to maintain a substantially constant fluid pressure on one side of each of said pistons, and cyclically to apply operating fluid and to vent the cylinder spaces on the opposite side of each of said pistons, whereby the differential areas of said pistons cause movement thereof in one direction and the differential pressures thereon causes movement in the reverse direction.

3. A hydraulic actuator comprising, in combination, a plurality of engine cylinders arranged in spaced tandem relationship, a plurality of connected differential area engine pistons disposed in the respective engine cylinders, a source of operating fluid under pressure, means to admit operating fluid constantly to one side of each of said pistons and, cyclically to apply operating fluid and to vent the opposite side of each of said pistons to cause reciprocation of said pistons in their respective cylinders, and the connection between said pistons comprising a hollow rod open at its upper end to the space above the uppermost piston, said hollow rod having side passages opening into the space above each of the other of said plurality of pistons.

References Cited in the file of this patent

UNITED STATES PATENTS

| | | |
|---|---|---|
| 812,151 | Nordberg | Feb. 6, 1906 |
| 1,790,203 | Ekstromer | Jan. 27, 1931 |
| 2,361,130 | Simpson | Oct. 24, 1944 |
| 2,366,777 | Farley et al. | Jan. 9, 1945 |
| 2,642,045 | Potts | June 16, 1953 |